United States Patent [19]

Evers et al.

[11] 3,873,731
[45] Mar. 25, 1975

[54] IMPARTING MEAT FLAVOR WITH 3-FURYLTHIOESTERS

[75] Inventors: William J. Evers, Atlantic Highlands; Howard H. Heinsohn, Jr., Hazlet; Bernard J. Mayers, Clifford Beach; Elizabeth A. Karoll, Old Bridge, all of N.J.

[73] Assignee: International Flavors & Fragrances Inc., New York, N.Y.

[22] Filed: Aug. 7, 1973

[21] Appl. No.: 386,451

[52] U.S. Cl. ................................ 426/65
[51] Int. Cl. ............................... A23l 1/26
[58] Field of Search ............. 260/347.2, 332.2 C; 426/65, 175

[56] References Cited
UNITED STATES PATENTS
3,666,495  5/1972  Evers et al. .................. 426/65
FOREIGN PATENTS OR APPLICATIONS
1,283,912  8/1972  United Kingdom ............... 426/65

*Primary Examiner*—Joseph M. Golian
*Attorney, Agent, or Firm*—Arthur L. Liberman, Esq.; Harold Haidt, Esq.

[57] ABSTRACT

Methods for altering the organoleptic properties of foodstuffs comprising incorporating with such foodstuffs a small but effective amount of at least one 3 thia furan having the formula:

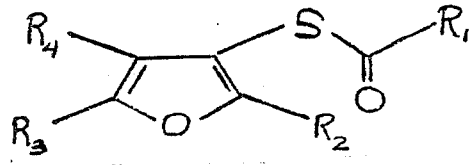

wherein $R_1$ is $C_1$–$C_7$ straight chain or branched chain alkyl or alkenyl; or $R_1$ is either furyl, thienyl, toluyl, phenyl ethenyl or phenyl; and wherein each of $R_2$, $R_3$ and $R_4$ is the same or different hydrogen or lower alkyl together with compositions containing the 3-thia furans for use in altering such organoleptic properties.

20 Claims, No Drawings

IMPARTING MEAT FLAVOR WITH 3-FURYLTHIOESTERS

BACKGROUND OF THE INVENTION

The present invention provides methods for altering the organoleptic properties of foodstuffs by adding to such foodstuffs quantities of one or more 3-thia furans and it further relates to compositions adapted to alter the organoleptic properties of foodstuffs.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variation can be reflected in the end product and results in unreliable flavor characteristics and uncertainity as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a different task since the magnetism for flavor development in many foods is not understood. This is noteable in products having meaty and roasted flavor characteristics. It is also noteable in products having vegetable-like and hydrolyzed vegetable protein-like and anise-like flavor characteristics.

Reproduction of roasted and meat flavors and aromas and vegetable-like and hydrolyzed vegetable protein-like and anise-like flavors and aromas has been the subject of the long and continuing search by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of roasted meat products and liver products and vegetable products are required.

Moreover, there are a great many meat containing or meat based foods presently distributed in a preserved form. Examples being condensed soups, dry-soup mixes, dry meat, freeze-dried or lyophilized meats, packages gravies and the like. While these products contain meat or meat extracts, the fragrance, taste and other organoleptic factors are very often impaired by the processing operation and it is desirable to supplement or enhance the flavors of these preserved foods with versatile materials which have either roasted meat or gravy-like or vegetable-like or meat-like or ham-like nuances.

U.S. Pat. No. 3,666,495 provided materials having such desirable meat, roast meat and roasted fragrance and flavor notes. Such materials are organic oxygen containing heterocyclics wherein the second carbon atom from the oxygen atom contains a sulfur substituent and included 3-thia furan compounds having the structure:

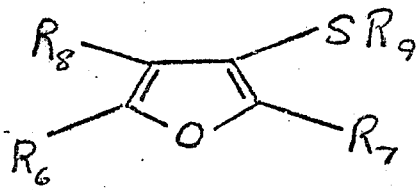

wherein $R_6$, $R_7$, $R_8$ and $R_9$ are the same or different alkyl or hydrogen. The process disclosed in this patent indicated that such furan 3-thiols and alkyl substituted furan 3-thiols can be produced by the reaction of an appropriate dihydro furanone-3-or tetrahydro furanone-3-with hydrogen sulfide in the presence of anhydrous hydrogen chloride at temperatures of −60°C to −100°C.

South African Pat. No. 69/4539 dated June 26, 1969 discloses, for use as intermediates for subsequent reaction with hydrogen sulfide to form flavor compounds, dihydro furyl thioesters having the structure:

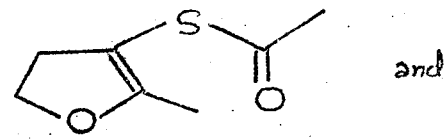

and

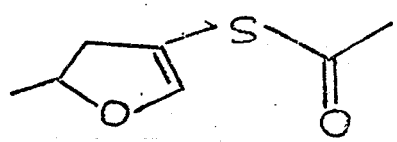

See pages 6 and 7 of the said South African patent.

Volume 24 "Food Technology" page 535 (May, 1970) [the "Gras IV" list No. 3162] discloses the use as a flavor adjuvant furfural S thioacetate having the structure:

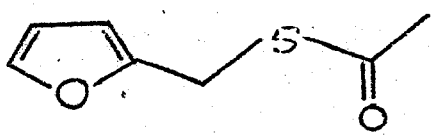

Nothing in the prior art, however, sets forth implicitly or explicitly the 3-furyl thioesters of our invention and their unique and advantageous and unobvious flavor properties.

THE INVENTION

The present invention provides methods for altering the organoleptic properties of foodstuffs which comprise adding to such materials at least one 3-thia furan. Briefly, the methods comprise adding an amount of at least one thia furan having the formula:

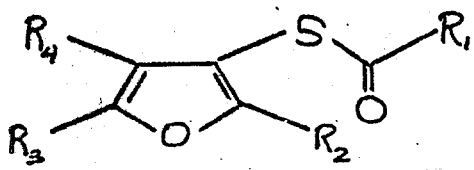

wherein $R_1$ is $C_1$-$C_7$ straight chain or branched chain alkyl or alkenyl or $R_1$ is either furyl, thienyl, toluyl, phenyl ethenyl or phenyl; wherein each of $R_2$, $R_3$ and $R_4$ is the same or different hydrogen or lower alkyl to a foodstuff to change the organoleptic properties of said foodstuff. The invention also contemplates compositions containing such 3-thia furan compounds.

Preferred 3-thia furans useful in our invention are as follows:

3-thio acetyl furan
2,5-dimethyl-3-thio acetyl furan
2-methyl-3-thio acetyl furan
2,5-dimethyl-4-ethyl-3-thio acetyl furan
2-methyl-3-thio isobutyryl furan
2,5-dimethyl-3-thio isobutyryl furan
2,5-dimethyl-3-thio isovaleryl furan
2-dimethyl-3-thio isovaleryl furan
2-methyl-3(2-thio furoyl) furan
2,5-dimethyl-3(2-thio furoyl) furan
2-methyl-3-thio octanoyl furan
2,5-dimethyl-3-thio octanoyl furan
2,5-dimethyl-3-thio benzoyl furan
2,5-dimethyl-3-thio propionyl furan
2-methyl-3-thio pivaloyl furan
2,5-dimethyl-3-thio pivaloyl furan
2,5-dimethyl-3-thio hexanoyl furan
2-propyl-3-thio acetyl furan
2,5-dimethyl-3-thio(2-methyl-2-pentenoyl) furan
2,5-dimethyl-3-thio toluoyl furan
2,5-dimethyl-3-thio cinnamoyl furan
2,5-dimethyl-3-thio (2-methyl-2-pentenoyl) furan The novel compounds of our invention may be produced according to processes which comprise the steps of:

i. providing a 2-ene-1,4 dione having the structure:

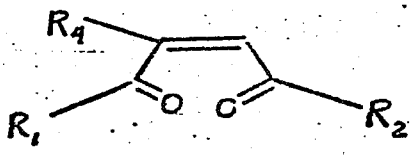

ii. intimately admixing said 2-ene-1,4 dione with a thio acid having the formula $R_3SH$ thereby providing a substituted or unsubstituted 2-thia substituted 1,4 dione having the structure:

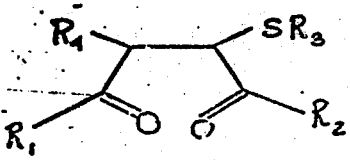

iii. cyclizing said 2-thia substituted 1,4 dione to form a substituted or unsubstituted 3-thia furan having the formula:

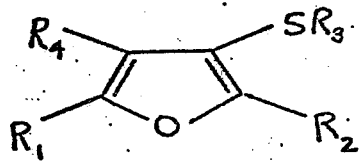

iv. optionally but only when $R_3$ is acyl or aroyl, hydrolyzing the 3-thia furan to form a 3-mercapto furan having the structure:

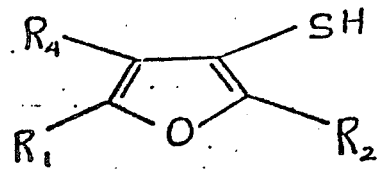

v. reacting the thus formed 3-mercapto furan with an acylating or aroylating agent thus forming a new acyl or aroyl 3-thia furan having the structure:

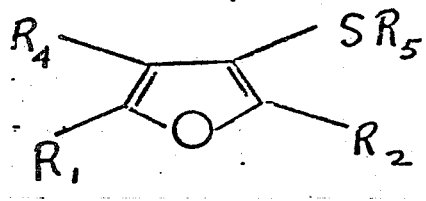

wherein $R_1$ is straight chain or branched chain alkyl or alkenyl having from 1 up to 7 carbon atoms or $R_1$ is either of furyl, thienyl, toluyl, phenyl ethenyl, or phenyl; wherein each of $R_2$, $R_3$ and $R_4$ is the same or different hydrogen or lower alkyl; wherein $R_3$ is acyl or aroyl; and wherein $R_5$ is acyl or aroyl different from $R_3$. $R_1$ or/and $R_2$ may each be hydrogen in the event that in step (ii) the 2-ene-1,4 dione is admixed with the thio acid having the formula $R_3SH$ in the presence of an organic base such as piperidine, pyridine, triethyl amine, quinoline or $\alpha$-picoline or a mixture thereof.

The 2-ene-1,4 dione may be prepared by reacting 2,5-dialkoxy-2,5 dialkyl-2,5-dihydrofuran with a weak acid hydrolysis agent such as 1% aqueous acetic acid under reflux conditions. The resulting material will be in the case of starting with 2,5-dimethoxy-2,5-dimethyl-2,5-dihydrofuran, cis-3-hexen-2,5-dione.

The resulting 2-ene-1,4 dione is then reacted with a thio acid having the formula $R_3SH$ wherein $R_3$ is either acyl or aroyl.

Examples of such thio acids are:
Thioacetic acid
Thiopropionic acid
Thiobutyric acid
Thioisobutyric acid
Thio-n-pentenoic acid
Thiocinnamic acid
Thiobenzoic acid
2-Methyl Thiobenzoic acid
3-Methyl Thiobenzoic acid
4-Methyl Thiobenzoic acid
2,4-Dimethyl Thiobenzoic acid
3,5-Dimethyl Thiobenzoic acid Whether an organic base is used or not in the reaction with the 2-ene-1,4 dione with the thio acid having the formula $R_3SH$, the 2-ene-1,4 dione can be exemplified as follows:

| Compound Name | $R_1$ | $R_2$ | $R_4$ |
|---|---|---|---|
| 3-Hexen-2,5-dione | Methyl | Methyl | Hydrogen |
| 3-Methyl-3-hexen-2,5 dione | Methyl | Methyl | Methyl |
| 3-Methyl-3-hepten-2,5 dione | Methyl | Ethyl | Methyl |
| 3-Ethyl-3-hepten-2,5 dione | Methyl | Ethyl | Ethyl |
| 4-Ethyl-4-octen-3,6 dione | Ethyl | Ethyl | Ethyl |
| 3-Propyl-3-hepten-2,5 dione | Methyl | Ethyl | Propyl |
| 4-Methyl-3-hepten-2,5 dione | Ethyl | Methyl | Methyl |
| 4-Methyl-4-octen-3,6 dione | Ethyl | Ethyl | Methyl |
| 4-Methyl-4-nonen-3,6 dione | Ethyl | Propyl | Methyl |
| 4-Propyl-3-hepten-3,6 dione | Ethyl | Methyl | Propyl |
| 5-Methyl-5-decene-4,7 dione | Propyl | Propyl | Methyl |
| 5-Methyl-4-nonen-3,6 dione | Propyl | Ethyl | Methyl |
| 4-Methyl-3-nonen-2,5 dione | Butyl | Methyl | Methyl |
| 4-Ethyl-3-nonen-2,5 dione | Butyl | Methyl | Ethyl |
| 3-Methyl-3-nonen-2,5 dione | Methyl | Butyl | Methyl |
| 3-Propyl-3-nonen-2,5 dione | Methyl | Butyl | Propyl |
| 3-Butyl-3-hexen-2,5 dione | Methyl | Methyl | Butyl |
| 4-Octen-3,6-dione | Ethyl | Ethyl | Hydrogen |

As stated above, $R_1$ and $R_2$ can each be hydrogen for the purposes of these processes of our invention in the event that in the reaction of the 2-ene-1,4 dione with the thio acid of the formula $R_3SH$, an organic base is used. Hence, in addition to the foregoing compounds, the following compounds can be utilized in the reaction with $R_3SH$:

| Compound Name | $R_1$ | $R_2$ | $R_4$ |
|---|---|---|---|
| 2-Buten-1,4-dial | Hydrogen | Hydrogen | Hydrogen |
| 2-Methyl-2-Buten-1,4 dial | Hydrogen | Hydrogen | Methyl |
| 2-Pentenal-4-one | Methyl | Hydrogen | Hydrogen |
| 2-Hexenal-4-one | Ethyl | Hydrogen | Hydrogen |
| 3-Methyl-2-Hexenal-4-one | Ethyl | Hydrogen | Methyl |
| 2-Methyl-2-pentenal-4-one | Hydrogen | Methyl | Hydrogen |
| 2-Methyl-2-heptenal-4-one | Hydrogen | Propyl | Methyl |
| 2-Methyl-2-octenal-4-one | Hydrogen | Butyl | Methyl |

Examples of useful organic bases are piperidine, pyridine, quinoline, triethyl amine and α-picoline. In place of such organic bases, radical initiators may be used such as benzoyl peroxide or azobisisobutyl nitrile. The reaction may be is carried out in a solvent such as water or an ether such as diethyl ether or a hydrocarbon such as benzene or hexane or cyclohexane. The reaction may also be carried out without the use of a solvent. The reaction may be is carried out under reflux conditions although temperatures varying from 0° up to 60°C are suitable and will give rise to commercially suitable yields. Examples of reaction products, 2-thia substituted-1,4-diones which are formed from the reaction of the 2-ene-1,4 diones with the thio acids having the formula $R_3SH$ are as follows:

| 2-ene-1,4 dione Reactant | $R_3SH$ Thio Acid Reactant | 2-Thia Substituted 1,4-dione Reaction Product |
|---|---|---|
| 3-Hexen-2,5 dione | Thioacetic acid | 3-Thioacetyl-2,5-hexane dione |
| 3-Methyl-3-hexen-2,5 dione | Thiopropionic acid | 3-Thiopropionyl-4-methyl hexane-2,5-dione |
| 3-Methyl-3-heptene-2,5-dione | Thiobenzoic acid | 4-Thiobenzoyl-4-methyl heptane-3,6-dione |
| 4-Ethyl-4-octene-3,6-dione | Thioacetic acid | 4-Thioacetyl-5-ethyl octane-3,6-dione |
| 2-Pentenal-4-one | 4-Methyl-thio-benzoic acid | 2-Thiobenzoyl-pentanal-4-one |

The foregoing 2-thia substituted 1,4 diones are then cyclized to form substituted or unsubstituted 3-thiafurans according to the following reaction:

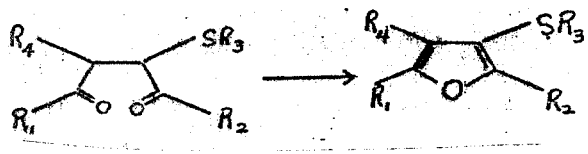

wherein $R_1$ and $R_2$ are the same or different and are each hydrogen or lower alkyl; wherein $R_3$ is either acyl or aroyl and $R_4$ is hydrogen or lower alkyl. The resulting 3-thiafurans (novel compounds of our invention) may be used as such for their organoleptic properties or they may be hydrolyzed and then reacylated or rearoylated to form other acyl thia or aroyl thia substituted furans (other novel compounds of our invention) which have still other organoleptic properties useful for flavoring foodstuffs.

The cyclization reaction carried out in cyclizing the 2-thia substituted-1,4-dione is carried out in the presence of a cyclization agent, preferably, isopropenyl acetate. The cyclization is also carried out in the presence of such a catalyst as concentrated sulfuric acid, zinc chloride, boron trifluoride, aluminum trichloride, and para-toluene sulfonic acid, each of these being acid catalysts. Preferably, the ratio of isopropenyl acetate to 2-thia substituted 1,4 dione is 4 to 5:1. The ratio of acid catalyst to isopropenyl acetate is from 0.001 up to 0.05 (mole ratio). The cyclization reaction may be run at temperatures of between 25°C up to reflux at atmospheric pressure (96°C). Still greater reflux temperatures may be used if the pressure is greater than atmospheric. Furthermore, in place of isopropenyl acetate as a cyclization reagent, acetic anhydride or propionic anhydride may be used. Ratios of acetic anhydride or propionic anhydride to 2-thia substituted 1,4 dione are preferably 4 to 5:1 (mole ratio).

In the event that the resulting 3-thia furan is desired to be used as a food flavor additive, the reaction product is purified by appropriate extraction and distillation techniques. Thus, the following 3-thia furans of our invention produced in this manner have useful organoleptic properties giving rise to their use as foodstuff flavors as set forth in an illustrative manner in the following table:

| 2-Thia Substituted 1,4-dione Reactant | 3-Thio Furan Reaction Product | Flavor Properties of 3-Thia Furan Reaction Product |
|---|---|---|
| 3-Thio acetyl-2,5-hexane dione | 2,5-dimethyl-3-thio acetyl furan | Roasted meat and gravy-like aroma; roasted meat flavor at 2 ppm (threshold value 0.05 ppm) Sweet floral horseradish fragrance |
| 3-Thio benzoyl-2,5-hexane dione | 2,5-dimethyl-3-thio benzoyl furan | Cooked chicken-like aroma with roasted meat nuance; fatty floral-like eggy flavor at 2 ppm (threshold 0.1 ppm). |

An optional additional step is hydrolysis of the 3-thia furan to form 3-mercapto furan having the structure:

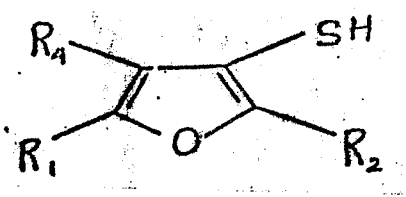

The hydrolysis reaction is carried out in the presence of strong aqueous base, for example, sodium hydroxide, potassium hydroxide, sodium carbonate, lithium carbonate, potassium carbonate, and lithium hydroxide. The mole ratio of base to 3-thia furan is preferably 1:1 but may be as high as 3:1 or as low as 0.01:1. In addition to solely aqueous solutions of base, mixtures of alcohol (e.g., methanol and ethanol) and water may be used as solvents in the hydrolysis reaction. The hydrolysis temperature may vary from room temperature to reflux. In the event that the basic solution is a solution which is alcoholic (substantially purely alcoholic) the alkali metal thiafuran may be formed.

Reacylation of the 3-furan thiol to yield still other acyl thiafurans or aroyl thiafurans is carried out by reaction of the appropriate acyl or aroyl halide with the 3-furan thiol in the presence of an appropriate solvent such as diethyl ether, tetrahydro furan, or cyclohexane and in the presence of preferably a strong organic base such as pyridine or α-picoline. Thus, the following table sets forth the several compounds which can be conveniently formed having a large number of organoleptic properties giving rise to a wide field of flavor uses:

| Name of Compound | Organoleptic Property |
|---|---|
| 2-Methyl-3-thio-isobutyl furan | Sweet, fruity anise-like and liver-like aromas; anise-like sweet fruity roasted meat flavor at 0.05 ppm concentration |
| 2,5-Dimethyl-3-thio-isobutyl furan | Meaty, ham, green vegetable aroma; ham-like meaty vegetable nutty flavor at 0.1 ppm concentration |
| 2,5-Dimethyl-3-thio-isovaleryl furan | Creamy cocoa-like sweet aroma. Cocoa powder creamy green flavor at 0.1 ppm concentration |
| 2-Methyl-3-thio-isovaleryl furan | Green meaty vegetable-like aroma. Green meaty vegetable-like HVP-like flavor at 0.1 ppm concentration |
| 2-Methyl-3(2-thio-furoyl) furan | HVP-like, meaty aroma; HVP-like, liver-like meaty flavor at 0.02 ppm concentration |
| 2,5-Dimethyl-3(2-thio-furoyl)furan | HVP-like, meaty aroma. HVP-like meaty flavor at 0.1 ppm |

| Name of Compound | Organoleptic Property |
| --- | --- |
| 2-Methyl-3-thio-octanoyl-furan | Meaty, sour, floral aroma; meaty, sour, floral HVP-like flavor at 0.1 ppm concentration |
| 2,5-Dimethyl-3-thio-octanoyl furan | Meaty brothy aroma; meaty, brothy, nutty aroma with HVP after-taste at 0.1 ppm concentration |
| 2,5-Dimethyl-3-thio-benzoyl furan | Cooked chicken-like roasted meat-like aroma; floral-like, fatty flavor at 2 ppm (0.1 ppm threshold) |
| 2-Methyl-3-thiopivaloyl furan | Roasted meat, sweet aroma; roasted meat vegetable-like flavor at 0.1 ppm concentration |
| 2,5-Dimethyl-3-thiopivaloyl furan | Sweet-meaty chicken-like aroma; Sulfury meaty flavor at 0.5 ppm |
| 2,5-Dimethyl-3-thio-hexanoyl furan | Meaty, green, creamy aroma; meaty, green, creamy, nutty flavor at 0.5 ppm (0.1 ppm threshhold level) |
| 2,5-Dimethyl-3-thio-cinnamoyl furan | Meaty, brown sugar, green walnut aroma; meaty, rubbery, walnut sweet flavor at 2 ppm concentration. |
| 2,5-Dimethyl-3-thio(m-toluoyl) furan | Roasted meat, liver, sulphury aroma; meaty, green roasted meat liver, sulphury fresh walnut kernal flavor at 1 ppm. |
| 2,5-Dimethyl-3-thio(2-methyl-2-pentenoyl) furan | Meaty, sweet, HVP, creamy aroma; sweet roasted meat, rubbery flavor at 0.1 ppm. |

Thus, the 3-thiafuran derivatives and mixtures thereof according to the present invention can be used to alter, vary, fortify, modify, enhance, or otherwise improve the organoleptic properties, including flavor and/or aroma, of a wide variety of materials which are ingested, consumed, or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such 3-thiafuran derivatives are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or non-alcoholic beverages, milk and dairy products, nut butters such as peanut butter and other spreads, seafoods including fish, crustaceans, mollusks and the like, candies, breakfast foods, baked goods, vegetables, cereals, soft drinks, snack foods, dog and cat foods, other veterinary products, and the like.

When the 3-thiafuran derivatives according to this invention are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise nondeleterious, conventional materials can be used and broadly include other flavor materials, vehicles, stabilizers, thickeners, surface active agents, conditioners, and flavor intensifiers.

Examples of preferred co-flavoring adjuvants are:
Methyl thiazole alcohol (4-methyl-5-$\beta$-hydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfural alcohol;
2-Mercapto propionic acid;
2-Pentene;
Alkyl pyrazine;
Methyl pyrazine;
2-Ethyl-3-methyl pyrazine;
Tetramethyl pyrazine;
Polysulfides;
Dipropyl disulfide;
Methyl benzyl disulfide;
Alkyl thiophenes;

2-Butyl thiophene;
2,3-Dimethyl thiophene;
5-Methyl furfural;
Acetyl furan;
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Cysteine;
Hydrolyzed vegetable protein;
Hydrolyzed fish protein; and
Tetramethyl pyrazine The 3-thiafuran derivatives, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The 3-thiafuran compounds according to this invention can be incorporated with the carriers by conventional means such as spray-drying, drum-drying, and the like. Such carriers can also include materials for coacervating the 3-thiafuran derivatives (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

The quantity of 3-thiafuran derivatives or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate compositions contain from about 0.02 parts per million (ppm) to about 250 ppm of 3-thiafuran derivative or derivatives. More particularly, in food compositions it is desirable to use from about 0.05 ppm to 100 ppm for enhancing flavors and in certain preferred embodiments of the invention, from about 0.2 to 50 ppm of the derivatives are included to add positive flavors to the finished product. All parts, proportions, percentages, and ratios herein are by weight unless otherwise indicated.

The amount of 3-thiafuran material or materials of our invention to be utilized in flavoring compositions can be varied over a wide range depending upon the particular quality to be added to the foodstuff. Thus, amounts of one or more derivatives according to the present invention of from about 2 ppm up to 80 or 90 percent of the total flavoring composition can be incorporated in such compositions. It is generally found to be desirable to include from about 10 ppm up to about 0.1 percent of the 3-thiafuran derivatives in such compositions.

The following examples are given to illustrate embodiments of the invention as it is preferably preferred to practice it. It will be understood that these examples are illustrative and the invention is not to be considered as restricted thereto except as indicated in the appended claims.

EXAMPLE I (Preparation of Cis-3-hexene-2,5-dione)

In a 1000 ml round bottom flask fitted with condenser and magnetic stirrer are placed 200 g of 2,5-dimethoxy-2,5-dimethyl-2,5-dihydrofuran and 200 ml of a 1% aqueous acetic acid solution. The resulting solution is heated to reflux, refluxed for 2 minutes, cooled with an ice bath to 25°C and 625 ml of a 2% sodium bicarbonate solution is added. The solution is saturated by addition of 23 g of sodium chloride and extracted with methylene chloride (1 × 200 ml and 3 × 100 ml). After drying over sodium sulfate removal of the methylene chloride in vacuo gives 142 g of crude cis-3-hexene-2,5-dione which by GLC analysis is about 90% product having the structure:

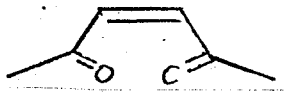

EXAMPLE II (Preparation of 3-Thioacetyl-2,5-hexanedione)

In a 1000 ml round bottom flask fitted with magnetic stirrer, thermometer, addition funnel and reflux condenser are placed 142 g of crude cis-3-hexene-2,5-dione (Example I), 380 ml of ether and 5 drops of piperidine. Thio acetic acid (96.6g) is added over a period of 1 hour. When about ⅛ of the thio acetic acid is added the solution begins to reflux which continues during the remainder of the addition. After addition is complete the mixture is allowed to stand for 85 minutes. Ether is then removed in vacuo (water asperator) to give 235 g of crude material containing about 91% 3-thioacetyl-2,5-hexanedione. Distillation of a 134 g portion of the crude gives 84.5 g of 3-thioacetyl-2,5-hexanedione boiling at 86° to 87°C at 0.5 torr. NMR, IR and mass spectral analysis confirm the structure;

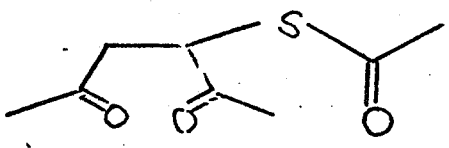

EXAMPLE III (Preparation of 2,5-Dimethyl-3-thioacetyl furan using isopropenyl acetate)

In a 500 ml three necked round bottom flask fitted with reflux condenser, thermometer, mechanical stirrer and addition funnel is placed 225 ml of isopropenyl acetate. The isopropenyl acetate is heated to reflux and 0.5 ml of concentrated sulfuric acid is added. A solution of 25 g of 3-thioacetyl furan (produced according to Example II) in 25 ml of isopropenyl acetate is added over a 20 minute period while maintaining reflux. The mixture is heated at reflux for an additional 20 minutes and then cooled to room temperature during which time 10 g of sodium bicarbonate is added. After removal of isopropenyl acetate in vacuo (35° at 20 mm), 50 ml of benzene is then added and the mixture is placed in a separatory funnel. 10 ml of water is then added to the mixture, and when carbon dioxide evolution stops, the aqueous layer is separated. Concentration in vacuo (35° bath, 20 mm) of the organic phase gives 22.2 g of a dark brown oil. Distillation of the oil gives 16.5 g of 2,5-dimethyl-3-thioacetyl furan boiling at 47 to 48° C at 0.25 mm.

EXAMPLE IV (Preparation of 2,5-Dimethyl-3-furanthiol)

In a 1000 ml, three-necked flask fitted with thermometer, reflux condenser, nitrogen inlet and mechanical stirrer is placed 35 g of 2,5-dimethyl-3-thioacetyl furan (Produced by the process of Example III) and 350 ml of 15% sodium hydroxide solution. The two phase mixture is heated to reflux and after 35 minutes becomes homogeneous. The mixture is heated another 20 minutes and cooled to room temperature. The pH of the solution is adjusted to 1 by the addition of 310 ml of 20% sulfuric acid and the resulting mixture extracted with ether (3 × 100 ml). Washing of the combined ether solutions with saturated sodium chloride solution (4 × 75 ml), drying with anhydrous sodium sulfate and solvent removal in vacuo (25°C at 55 mm) gives 26.2 g of crude material. Distillation of the crude material gives 17.3 g of 2,5-dimethyl-3-furanthiol boiling at 79°C at 43 mm. MS, NMR and IR analysis confirm the material as 2,5-dimethyl-3-furanthiol.

EXAMPLE V (Preparation of 3-Mercapto-2,5-hexanedione)

To 150 ml of a 2% sodium hydroxide solution in a flask fitted for stirring is added 10 g of 3-thioacetyl-2,5-hexanedione. After stirring for 1 hour the pH of the mixture is adjusted to 5-6 by the addition of dilute (10%) hydrochloric acid, the solution is saturated with sodium chloride solution and extracted with ether (4 × 25 ml). The ether extracts are combined, washed with saturated sodium chloride solution (15 ml), dried and concentrated in vacuo to give 6.2 g of crude 3-mercapto-2,5-hexanedione. Vacuum distillation gives 2.5 g of 3-mercapto-2,5-hexanedione boiling at 57°-59°C at 0.85 torr. NMR, IR and mass spectral analysis confirm the structure as 3-mercapto-2,5-hexanedione.

EXAMPLE VI (Preparation of 2-Methyl-3-furanthiol)

A. 4-Oxo-2-pentanal

Into a 5 liter, three-necked flask fitted with mechanical stirrer, thermometer and vacuum take-off are placed 600 g of 2-methyl-2,5-dimethoxy-2,5-dihydrofuran and 2400 ml of deionized water. After 20 minutes of stirring at room temperature, the mixture becomes homogeneous and has a pale yellow green color. Analysis of a sample of the reaction mixture by GLC after 3.25 hours shows 22% methanol, 67% 4-oxo-2-pentanal and 9% starting material. Vacuum (26 torr.) is applied to the reaction mixture while maintaining the temperature of the reaction mixture between 25° and 30°C. After 3.25 hours GLC analysis shows 13% methanol, 82% 4-oxo-2-pentanal and 3.2% starting material. The vacuum is removed and the reaction mixture is allowed to stand at room temperature overnight. Analysis after standing overnight shows 12.9% methanol, 85% 4-oxo-2-pentanal and 2.1% starting material.

B. 3-Thioacetyl-4-oxo-pentanal

In a 5 liter, three-necked flask fitted with mechanical stirrer, thermometer and addition funnel are placed 2325 ml of the solution obtained in (A) and 2 ml of piperidine diluted in 5 ml of water. To this solution is added a mixture of thiolacetic acid (292.3 g) and piperidine (13 ml) over a 20 minute period. After standing an additional 10 minutes, 20 ml of concentrated hydrochloric acid is added, the resulting mixture poured into a separatory funnel and the oil layer removed. The aqueous layer is extracted with benzene (500 ml) and methylene chloride (2 × 500 ml). The benzene extract is combined with the oil layer and the mixture is dried over sodium sulfate. The methylene chloride extracts are combined and dried over sodium sulfate. Solvent removal in vacuo (40°-45° bath at 15 torr.) gives 414.5 g of crude oil from the benzene extract and 172.5 g of crude oil from the methylene chloride extracts. The crude 3-thioacetyl-4-oxo-pentanal is used "as-is" in the next step.

C. 2-Methyl-3-thioacetyl furan

In a 12 liter, three-necked flask fitted with stirrer, reflux condenser, thermometer and addition funnel are placed 2950 ml of isopropenyl acetate and 2 ml of concentrated sulfuric acid. The mixture is heated to reflux and a solution of crude 3-thioacetyl-4-oxo-pentanal (587 g) (obtained in Part (B) supra) in 1,170 ml of isopropenyl acetate is added over a 35 minute period. After refluxing an additional 40 minutes sodium bicarbonate (35 g) is added and removal of excess isopropenyl acetate in vacuo is commenced. The pressure is gradually decreased from 200 to 30 torr. as the temperature of the reaction mixture drops from 90°C to 30°C at which temperature it is maintained until the volume of the reaction mixture is about 1500 ml. The material is further concentrated in vacuo (bath temperature 50°C and 5 torr.) to form a dark brown oil. The concentrate is diluted with 750 ml of benzene and washed with 250 ml of water. After drying over sodium sulfate solvent removal in vacuo (40°-50°C bath temperature and 10 mm) gives 647 g of a dark brown oil. Distillation of this oil gives 26.8 g of material boiling at 67°-70°C at 1.1 mm. which is 62% 2-methyl-3-thioacetylfuran. Redistillation gives 150 g of 2-methyl-3-thioacetylfuran of 86% purity determined by GLC boiling at 73°–76°C at 5.8 to 6.2 mm Hg. pressure.

D. Hydrolysis of 2-Methyl-3-thioacetylfuran to 2-methyl-3-furanthiol

A 5% solution (1500 ml) of sodium hydroxide in water is heated to reflux under nitrogen. When reflux commences 151 g of 2-methyl-3-thioacetylfuran is added over a 15 minute period. After 5 minutes heating is stopped and the mixture allowed to cool. When the temperature reaches 30°C, 258.1 g of sodium dihydrogen phosphate monohydrate and 10 ml of acetic acid are added. After the salt is dissolved the mixture is extracted with methylene chloride (3 × 250 ml). After drying the methylene chloride extracts by filtration through sodium sulfate and washing the sodium sulfate with 100 ml of methylene chloride, the combined methylene chloride solutions are concentrated in vacuo (30° at 25 mm) to yield 94.8 g of crude 2-methyl-3-furanthiol. Distillation gives 64.6 g of 2-methyl-3-furanthiol boiling at 55°–56° at 41–42 mm.

EXAMPLE VII (Preparation of 2-Thioacetylfuran)

A. Preparation of 2-Butene-1,4-dial

A mixture of 2,5-dimethoxy-2,5-dihydrofuran (20 g), water (80 ml) and acetic acid (3 drops) is stirred for 105 minutes at room temperature, 22 minutes at 40°C and 90 minutes between 60°C and 75°C. GLC analysis at this point indicates 15.7% starting material and 83.5% 2-butene-1,4-dial. The mixture is cooled to 25°C and sodium bicarbonate (0.3 g) is added.

B. Preparation of 3-Thioacetyl-1,4-butanedial

To the aqueous solution obtained in paragraph A, supra, is added 10 g of thiolacetic acid during a 14 minute period. During the addition, the temperature is kept below 30°C by intermittent application of a cooling bath. After 110 minutes, the reaction mixture is extracted with methylene chloride (3 × 35 ml). The combined methylene chloride extracts are dried and then concentrated in vacuo to give 17.3 g of yellow oil containing about 80% 2-thioacetyl-1,4-butanedial. The compound is identified through mass spectral, NMR and IR analysis as having the structure:

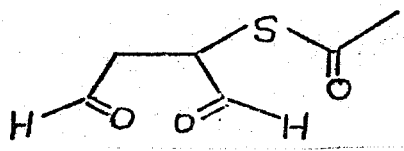

M.S. — No molecular ion; remaining peaks in decreasing intensity — 43, 29, 27, 45, 55, 60, 84, 100 and 142 m/e units.

NMR (CDCl$_3$) δ 2.38 (s,3) 3.02 (Multiplet 2 J=10H$_z$) 4.46 (t,1, J=10 H$_z$), 9.40 (s,1) and 9.68 (s,1) ppm.

IR (thin film) — 2850, 2750, 1720, 1700 (shoulder), 1388, 1352, 1132 and 958 cm$^{-1}$ C. Preparation of 3-thioacetylfuran In a 500 ml flask fitted with mechanical stirrer, reflux condenser, addition funnel and thermometer are placed 109 ml of isopropenyl acetate and 0.2 ml of concentrated hydrochloric acid. The resulting mixture is heated to reflux and, when reflux commences, a solution of crude 2-thioacetyl-1,4-butanedial (produced in paragraph B, supra) in 70 ml of isopropenyl acetate is added over a 31 minute period while maintaining reflux. The mixture is heated at reflux for 15 minutes after addition is complete. After cooling to 25°C, sodium bicarbonate (2.4 g) is added and the mixture stirred for 20 minutes. The mixture is concentrated in vacuo and 670 ml of benzene and 25 ml of water are added. The benzene layer is separated, washed with saturated sodium bicarbonate solution (5 × 25 ml), dried with sodium sulfate and concentrated in vacuo to give 14.7 g of an oil. Vacuum distillation gives 1.24 g of 97.5% pure 3-thioacetylfuran. Mass spectral, NMR and IR analysis confirm the structure as 3-thioacetylfuran.

Mass spectrum, molecular ion, then peaks in decreasing intensity; 142, 43, 100, 45, 69, 71, 72 and 73 m/e units.

NMR (CDCl$_3$) δ 2.34 (s,3), 6.38 (d,1,J=1H$_z$) and 7.46 (m,2,J=1H$_z$) ppm. IR (thin film) 3120, 1710, 1495, 1355, 1197, 1147), 1110, 1072, 1010, 953, 940, 870 and 795 cm$^{-1}$.

EXAMPLE VIII (Preparation of 2-Methyl-3-thioisobutyrylfuran)

A mixture of 1.0 g of 2-methyl-3-furanthiol, 0.70 g of pyridine and 10 ml of diethyl ether is placed in a flask and 0.93 g of isobutyryl chloride is added. After standing 30 minutes the resulting mixture is filtered and the filtrate concentrated in vacuo to a greenish yellow oil weighing 1.0 g. The product is isolated by preparative GLC. NMR, IR and mass spectral analysis confirmed the structure of the product as 2-methyl-3-thioisobutyrylfuran.

Similarly prepared using 2-methyl-3-furanthiol are:

| Acylating or aroylating Agent | 2-Methyl-3-thioacyl furan or 2-Methyl-3-thioaroyl furan Reaction Product |
| --- | --- |
| Isovaleryl chloride | 2-Methyl-3-thio-isovaleryl furan |
| Furoyl chloride | 2-Methyl-3-(2-thiofuroyl) furan |
| Octanoyl chloride | 2-Methyl-3-thio-octanoyl furan |
| Pivaloyl chloride | 2-Methyl-3-thio-pivaloyl furan |

EXAMPLE IX

The following formulation is prepared:

| Ingredient | Parts by Weight |
| --- | --- |
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thiobenzoyl furan | 2.00 |

The 2,5-dimethyl-3-thiobenzoyl furan has a sweet blending effect, imparting a meat taste of a nondescript character leaning towards chicken meat. This chemical helps reduce the typical hydrolyzed vegetable protein taste and ties in and rounds up the other meat-like chemicals in the formula.

EXAMPLE X

The following formulation is prepared:

| Ingredient | Parts by Weight |
|---|---|
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thiohexanoyl furan | 2.00 |

The 2,5-dimethyl-3-thiohexanoyl furan adds specific meat notes to the formulation. It is sweet and creamy and very specifically reminiscent of white meat chicken. In general, it upgrades the formula by imparting a distinct meat character.

EXAMPLE XI

The following formulation is prepared:

| Ingredient | Parts by Weight |
|---|---|
| Liquid hydrolyzed vegetable protein | 90 |
| 4-Methyl-beta-hydroxy-ethyl thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2,5-Dimethyl-3-thioacetyl furan | 2.00 |

The 2,5-dimethyl-3-thioacetyl furan causes the above formulation to be distinctly roast meat in character and in aroma and taste. It is typically gravy-like (roast meat gravy). The 2,5-dimethyl-3-thioacetyl furan also imparts a slight nutty note which can be associated with the roast meat gravy.

EXAMPLE XII

The following formulation is prepared:

| Ingredient | Parts by Weight |
|---|---|
| Liquid hydrolyzed vegetable protein | 90 |
| 4-Methyl-beta-hydroxy-ethyl-thiazole | 5 |
| Tetrahydro thiophene-3-one | 1 |
| Furfuryl mercaptan | 0.01 |
| 2-Nonenal | 0.50 |
| Difurfuryl disulfide | .49 |
| Dimethyl sulfide | 0.50 |
| Methyl mercaptan | 0.50 |
| 2-Methyl-3-thioacetyl furan | 2.00 |

The 2-methyl-3-thioacetyl furan causes the above formulation to be distinctly roast meat in character and in aroma and taste causes it to be typically gravy-like (roast meat gravy). The 2-methyl-3-thioacetyl furan is stronger and consequently the flavor is more predominantly roast meat. The sweet and roast nut notes are very reminiscent of roast meat gravy.

EXAMPLE XIII

The following formulation is prepared (butter flavor formulation):

| Ingredient | Parts by Weight |
|---|---|
| Diacetyl | 60.000 |
| Butyric acid | 250.000 |
| Caproic acid | 37.000 |
| Caprylic acid | 17.000 |
| 2,5-Dimethyl-3-thioisovaleryl furan | 0.004 |
| Acetyl propionyl | 2.500 |
| Methyl nonyl ketone | 0.100 |
| Cyclotene | 20.000 |
| Delta decalactone | 205.000 |
| Delta dodecalactone | 408.396 |

The 2,5-dimethyl-3-thioisovaleryl furan in the above butter flavor composition at 0.004% adds a sweet creaminess to the butter fulness. Flavoring margarine at 0.04% and approximately the same for baked products puts this application at 1 to 3 parts per billion.

EXAMPLE XIV

In Royal instant vanilla pudding (ingredients: sugar and dextrose, precooked starch, sodium and calcium phosphates, salt, vegetable shortening, artificial flavor and color, vegetable monoglycerides, butylated hydroxy anisole, butylated hydroxy toluene, citric acid and corn oil; produced by Standard Brands, Inc., New York, N.Y.) at 80 parts per billion (0.008 grams of 0.1% dilution of 2,5-dimethyl-3-thioisovaleryl furan in 100 grams of pudding) a panel evaluation (5 panelists) was performed. The panel of five agreed that the pudding was much sweeter with no off character than such pudding without the said 2,5-dimethyl-3thioisovaleryl furan. The panel of five also agreed that the general over-all aroma of the said pudding was enhanced as compared with the same pudding without the 2,5-dimethyl-3thioisovaleryl furan.

EXAMPLE XV

A panel evaluation similar to that carried out in Example XIV was carried out on Royal instant chocolate pudding containing 2,5-dimethyl-thioisovaleryl furan at a level of 80 parts per billion. The five panelists agreed that the 2,5-dimethyl-thioisovaleryl furan has a definite blending and rounding off effect on the pudding flavor. In addition, two of the panelists thought that the 2,5-dimethyl-3thioisovaleryl furan deepened the character of the cocoa itself and all five panelists agreed that the 2,5-dimethyl-3thioisovaleryl furan improved the general flavor character of the chocolate pudding as compared to the same chocolate pudding without said 2,5-dimethyl-3thioisovaleryl furan.

What is claimed is:

1. A process for altering the organoleptic properties of a foodstuff which comprises adding to said foodstuff a small but effective amount, to impart to said foodstuff a meaty aroma and taste, of a 3-furylthioester compound selected from the group consisting of:

3-Thioacetyl furan;
2-Methyl-3-thioacetyl furan;
2,5-Dimethyl-3-thioacetyl furan;
2-Methyl-3-thioisobutyryl furan;
2,5-Dimethyl-3-thioisobutyryl furan;
2-Methyl-3-thioisovaleryl furan;
2-Methyl-3-(2-thiofuroyl) furan;
2,5-Dimethyl-3(2-thiofuroyl) furan;
2-Methyl-3-thiooctanoyl furan;
2,5-Dimethyl-3-thiooctanoyl furan;
2,5-Dimethyl-3-thiobenzoyl furan;
2,5-Dimethyl-3-thiopropionyl furan;

2-Methyl-3-thiopivaloyl furan;
2,5-Dimethyl-3-thiopivaloyl furan;
2,5-Dimethyl-3-thiohexanoyl furan;
2-Propyl-3-thioacetyl furan;
2,5-Dimethyl-3-thio-(2-Methyl-2-pentenoyl) furan;
2,5-Dimethyl-3-thiocinnamoyl furan; and
2,5-Dimethyl-3-thio(m-toluyl) furan.

2. The process for altering the flavor of a foodstuff of claim 1 wherein the 3-furylthioester compound is 3-thioacetyl furan.

3. The process for altering the flavor of a foodstuff of claim 1 wherein the 3-furylthioester compound is 2-methyl-3-thioacetyl.

4. The process for altering the flavor of a foodstuff of claim 1 wherein the 3-furylthioester compound is 2,5-dimethyl-3-thioacetyl furan.

5. The process for altering the flavor of a foodstuff of claim 1 wherein the 3-furylthioester compound is 2-methyl-3-thioisobutyryl furan.

6. The process for altering the flavor of a foodstuff of claim 1 wherein the 3-furylthioester compound is 2,5-Dimethyl-3-thioisobutyryl furan.

7. The process for altering the flavor of a foodstuff of claim 1 wherein the 3-furylthioester compound is 2-Methyl-3-thioisovaleryl furan.

8. The process for altering the flavor of a foodstuff of claim 1 wherein the 3-furylthioester compound is 2-methyl-3(2-thiofuroyl) furan.

9. The process for altering the flavor of a foodstuff of claim 1 wherein the 3-furylthioester compound is 2,5-Dimethyl-3(thiofuroyl) furan.

10. The process for altering the flavor of a foodstuff of claim 1 wherein the 3-furylthioester compound is 2-methyl-3-thiooctanoyl furan.

11. The process for altering the flavor of a foodstuff of claim 1 wherein the 3-furylthioester compound is 2,5-dimethyl-3-thiooctanoyl furan.

12. The process for altering the flavor of a foodstuff of claim 1 wherein the 3-furylthioester compound is 2,5-dimethyl-3-thiobenzoyl furan.

13. The process for altering the flavor of a foodstuff of claim 1 wherein the 3-furylthioester compound is 2,5-dimethyl-3-thiopropionyl furan.

14. The process for altering the flavor of a foodstuff of claim 1 wherein the 3-furylthioester compound is 2-methyl-3-thiopivaloyl furan.

15. The process for altering the flavor of a foodstuff of claim 1 wherein the 3-furylthioester compound is 2,5-dimethyl-3-thiopivaloyl furan.

16. The process for altering the flavor of a foodstuff of claim 1 wherein the 3-furylthioester compound is 2,5-dimethyl-3-thiohexanoyl furan.

17. The process for altering the flavor of a foodstuff of claim 1 wherein the 3-furylthioester compound is 2-propyl-3-thioacetyl furan.

18. The process for altering the flavor of a foodstuff of claim 1 wherein the 3-furylthioester compound is 2,5-dimethyl-3-thio-(2-Methyl-2-pentenoyl) furan.

19. The process for altering the flavor of a foodstuff of claim 1 wherein the 3-furylthioester compound is 2,5-dimethyl-3-thiocinnamoyl furan.

20. The process for altering the flavor of a foodstuff of claim 1 wherein the 3-furylthioester compound is 2,5-dimethyl-3-thio(m-toluyl) furan.

* * * * *